United States Patent
Imai et al.

(10) Patent No.: US 12,455,490 B2
(45) Date of Patent: Oct. 28, 2025

(54) LOW RELATIVE PHASE NOISE OPTICAL COMB GENERATION DEVICE

(71) Applicant: XTIA LTD, Tokyo (JP)

(72) Inventors: Kazuhiro Imai, Tokyo (JP); Motonobu Kourogi, Tokyo (JP)

(73) Assignee: XTIA LTD, Tokyo (JP)

( * ) Notice: Subject to any disclaimer, the term of this patent is extended or adjusted under 35 U.S.C. 154(b) by 316 days.

(21) Appl. No.: 18/547,476

(22) PCT Filed: Dec. 21, 2021

(86) PCT No.: PCT/JP2021/047346
§ 371 (c)(1),
(2) Date: Aug. 22, 2023

(87) PCT Pub. No.: WO2022/176378
PCT Pub. Date: Aug. 25, 2022

(65) Prior Publication Data
US 2024/0126137 A1 Apr. 18, 2024

(30) Foreign Application Priority Data

Feb. 22, 2021 (JP) .................................. 2021-026718

(51) Int. Cl.
*G02F 1/35* (2006.01)
*G01B 9/02001* (2022.01)
*G01S 7/484* (2006.01)

(52) U.S. Cl.
CPC ......... *G02F 1/353* (2013.01); *G01B 9/02008* (2013.01); *G01S 7/484* (2013.01); *G02F 2203/56* (2013.01)

(58) Field of Classification Search
None
See application file for complete search history.

(56) References Cited

U.S. PATENT DOCUMENTS

| 4,983,978 A | 1/1991 | Levinson |
| 2001/0045513 A1 | 11/2001 | Motonobu |
| 2018/0095003 A1 | 4/2018 | Vahala |

FOREIGN PATENT DOCUMENTS

| JP | 2009244621 A | 10/2009 |
| JP | 2010/001809 | 1/2010 |

(Continued)

OTHER PUBLICATIONS

Generation of 10-GHz 2-ps optical pulse train over the C band based on an optical comb generator and its application to 160-Gbit/s OTDM systems, Koji Igarashi, Sep. 21, 2008, 34th European Conference on Optical Communication.

(Continued)

*Primary Examiner* — Phu Vu
(74) *Attorney, Agent, or Firm* — David R. Stevens; Stevens Law Group

(57) ABSTRACT

A purpose of the present invention is to provide a low relative phase noise optical comb generation device in which a repetitive frequency of an interference signal of an optical comb is stabilized by reducing a relative phase noise of driving signals with different frequencies for driving multiple optical comb generators in an optical comb distance meter. A low relative phase noise optical comb generation device, comprising: at least three oscillators 13, 13A, 13B for generating frequency signals with mutually different frequencies phase locked to a reference frequency signal F REF given by a reference oscillator 11; and at least two frequency converters 14A, 14B to which a frequency signal obtained by one oscillator 13 of the at least three oscillators and respective frequency signals obtained by respective oscillators 13A, 13B other than the one oscillator are input; wherein the at least two frequency converters 14A, 14B supply the at least two types of modulation signals, in which a relative phase noise is reduced respectively as a sum (Continued)

frequency signal or a difference frequency signal of the frequency signal by the one oscillator and a frequency signal by other oscillator with a lower phase noise, to at least two optical comb generators 15A, 15B as driving signals.

11 Claims, 10 Drawing Sheets

(56) References Cited

FOREIGN PATENT DOCUMENTS

| | | | |
|---|---|---|---|
| JP | 5231883 B | 7/2013 | |
| JP | 2013223040 A | 10/2013 | |
| JP | 2016045443 A | 4/2016 | |
| JP | 2020008357 A | 1/2020 | |
| WO | WO-2010001809 A1 * | 1/2010 | ........... G01B 9/0207 |

OTHER PUBLICATIONS

Improved DAC Phase Noise Measurements Enable Ultralow Phase Noise DDS Applications, Peter Delos, Analog Dialogue 51-08, Aug. 2017.
Phase Locked Coaxial Resonator Oscillators, Series PCRO, Ultra Electronics Herley, Aug. 2015.
Phase Locked Dielectric Resonator Oscillators Series Pdro, Ultra Electronics Herley, Aug. 2015.

* cited by examiner

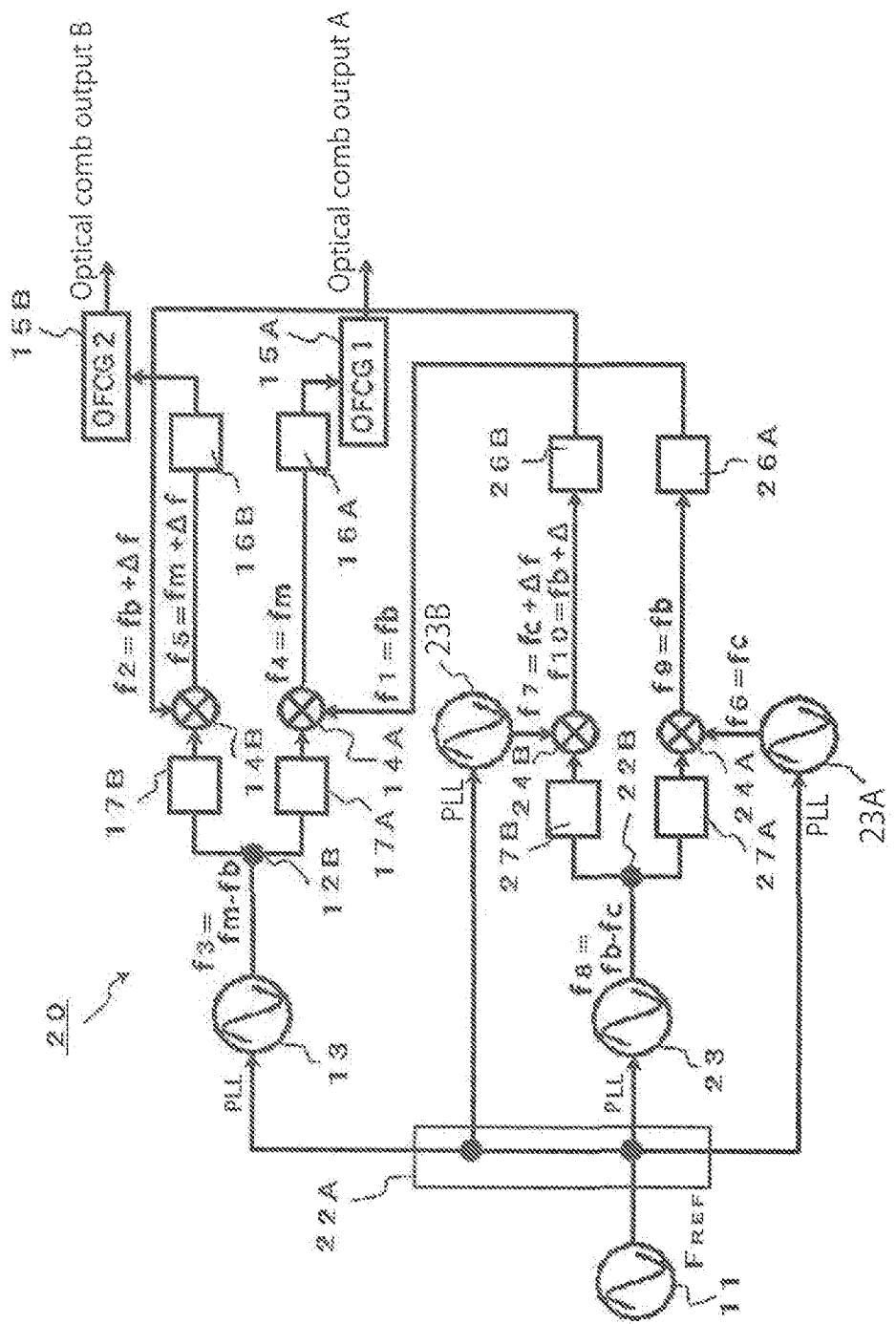
F I G. 6

LOW RELATIVE PHASE NOISE OPTICAL COMB GENERATION DEVICE

BACKGROUND OF THE INVENTION

Field of the Invention

The present invention relates to a low relative phase noise optical comb generation device for generating two or more optical combs used for example for an optical comb distance meter for measuring a distance from a time difference between an interference signal of a measuring light and an interference signal of a reference light. The present application claims priority based on Japanese Patent Application No. 2021-026718 filed in Japan on Feb. 22, 2021, which is incorporated by reference herein.

Description of Related Art

Conventionally, as an active distance measuring method capable of measuring a precise distance of a point, a distance measurement by a principle of optics using a laser light is known. In a laser distance meter for measuring a distance to a target object by using a laser light, a distance to an object to be measured is calculated based on a difference between a time of emission of a laser light and a time when the laser light reflected from the object to be measured is detected by a light receiving element. Also, for example, a driving current of a semiconductor laser is modulated by a triangular wave or the like, and a reflected light from a target object is received by using a photodiode embedded in a semiconductor laser element, and a distance information is obtained from a frequency of a sawtooth wave occurred in a photodiode output current.

A laser distance meter as a device for measuring an absolute distance from a certain point to a measuring point with high accuracy is known.

In a conventional absolute distance meter, it was difficult to achieve a practical absolute distance meter capable of measuring a long distance with high accuracy. Also, in order to obtain high resolution, a return to origin was necessary as a laser interferometer. So, there was only a method or means not suitable for an absolute distance measurement.

The present inventors have previously proposed a three-dimensional optical profiler, a method for measuring a distance, and a distance meter, comprising two optical comb generators for emitting pulses of a reference light and a measuring light with a coherence and mutually different modulation cycles, respectively modulated of its phase or intensity periodically, wherein a reference light detector detects an interference light of a reference light pulse emitted to a reference surface and a measuring light pulse emitted to a measuring surface, and a measuring light detector detects an interference light of the reference light pulse reflected from the reference surface and the measuring light pulse reflected from the measuring surface, wherein the distance meter is capable of measuring a distance with high accuracy and in short time by calculating a difference between a distance to the reference surface and a distance to the measuring surface from a time difference of two interference signals obtained by the reference light detector and the measuring light detector (for example, refer to Patent Document 1).

Also, the present inventors have previously proposed a three-dimensional optical profiler, a method for measuring a distance, and a distance meter, capable of performing a measurement with wide dynamic range of reflection light level continuously from a low reflection material to a high reflection material (for example, refer to Patent Document 2).

In an optical comb distance meter, by using a reference light pulse and a measuring light pulse with coherence emitted as a pulse from two optical comb generators driven by two types of modulation signals with different frequencies in principle, a frequency analysis of an interference signal (hereinafter, referred to as a reference signal) obtained by a reference light detector and an interference signal (hereinafter, referred to as a measuring signal) obtained by a measuring light detector is performed by a signal processing unit, and a mode number counted from a center frequency of an optical comb is defined as N, a phase difference of N-order mode of the reference signal and the measuring signal is calculated to offset a light phase difference of an optical comb production and transmission process from the optical comb generators to a reference point, and then, a distance from the reference point to the measuring surface is calculated by determining a phase difference of a reference signal pulse and a measuring signal pulse by calculating an increment of a phase difference per one order in a frequency axis.

As described in Patent Document 1, in order to secure a stability of a relative frequency of a frequency fm and a frequency fm+$\Delta$f of a driving signal source of two optical comb generators in an optical comb distance meter, it is important to relatively fix a repetitive frequency of a pulse.

Further, in an optical comb distance meter, when there is a phase noise or a phase fluctuation added other than a phase delay by a round trip of a measuring light pulse in a measuring section or a periodical phase rotation by a frequency difference of a frequency fm and a frequency fm+$\Delta$f, it will be a cause of variations in measuring results. An interference signal is generated in a cycle of 1/$\Delta$f, together with a reference signal and a measuring signal. A phase noise and a phase fluctuation of frequencies sufficiently lower than $\Delta$f (a cycle longer than 1/$\Delta$f) will be eliminated to a certain extent by a process for calculating a phase or a delay time of a measuring signal on the basis of a generation time of a reference signal. However, there is no means for correcting a phase fluctuation changing in a period shorter than a cycle of an inverse number of $\Delta$f, so it will appear as variations in measuring results as it is. A short-term stability of relative phase of fm and fm+$\Delta$f will be required for reducing variations of measurement value of one cycle of $\Delta$f which is a shortest time of a measuring time.

Modulation signals for driving two optical comb generators can be obtained by a modulation signal generator capable of setting a frequency, for example by PLL (Phase-Locked Loop).

However, even by using same reference oscillator, there is a possibility that a jitter of phase will be accumulated when increasing a comparative frequency with a low frequency to a driving frequency of microwave band by PLL. There is a possibility that a jitter will be added to a relative phase in a short term. In that case, a measurement accuracy will be decreased when measured in a short time. Therefore, in order to shorten a measuring time, a pair of oscillators with a phase-locked loop of wide band are required.

Also, in an optical comb distance meter, at a signal processing unit, a time difference of a peak of signals may be determined by using a peak detection circuit, or a relation of a frequency and a phase may be determined by a fast Fourier transformation of signals, and a distance measurement can be performed in a short time as a repetition of signal is fast.

In a technology disclosed in Patent Document 2, an orthogonal phase component of an original waveform is determined by a Hilbert transformation of a value of a second interference signal with low gain or a second interference signal with high gain, and a peak value of a square waveform of an envelope is obtained by a sum of squares of an original waveform and a Hilbert transform waveform.

This means that it is important to determine an envelope peak of an interference waveform in a distance meter and a shape measuring device of Patent Document 1 and Patent Document 2. As illustrated in FIG. 2 of Patent Document 1, an envelope peak is determined by an overlap of a reference pulse train and a measuring light pulse train. A jitter of each of a reference pulse train and a measuring light pulse train is determined by a phase noise of signals of fm and fm+Δf, so a jitter of an envelope peak of an interference signal of optical combs of fm and fm+Δf is determined by a relative phase noise of driving signals of optical combs of fm and fm+Δf.

Here, an example of a conventional optical comb drive circuit is illustrated in FIG. 1. A part explained here is excerpted from a light source 100 illustrated in FIG. 6 of Patent Document 1.

Oscillators 103A, 103B are phase locked to a common reference oscillator 104. Generally, as the reference oscillator 104, OCXO of 10 MHz, or OCXO of 10 MHz synchronized to a cesium atomic oscillator or a rubidium atomic oscillator, is used. An accuracy of an absolute frequency of a reference frequency is selected according to need according to a distance to be measured and a required accuracy. Optical comb generators 120A, 120B may be considered as a device for generating an optical pulse train when AC signals of the oscillators 103A, 103B for producing driving signals with a periodicity are crossing zero, and a jitter of respective pulses is determined by a phase noise of the oscillators 103A, 103B.

Here, in FIG. 2, a peak time of respective envelopes is indicated as $t_0, t_1, t_2, t_3, \ldots, t_n$, by referring to an example of waveform in FIG. 8 of Patent Document 1. In two optical comb generators 120A, 120B, a frequency of driving signals is respectively fm+Δf and fm, so in an envelope peak of an interference waveform, a difference frequency of driving signals is synchronized to Δf, and an envelope peak interval is Tb=1/Δf.

A time of an envelope peak of an interference waveform will be a peak at a timing that optical pulses output from the optical comb generators 120A, 120B are matched, as described in paragraph [0045] of Patent Document 1, so there is a jitter depending on a relative phase noise of two oscillators 103A, 103B driving the optical comb generators 120A, 120B.

A distance meter using an optical comb interference and a three-dimensional optical profiler determines a distance to an object from a time until an envelope peak of a measuring signal on the basis of an envelope peak of a reference signal. Its measurement accuracy is determined by a relative phase noise of two oscillators 103A, 103B, represented by RMS value of a jitter (jitter of $t_n$–nTb of deviation amount from periodicity) of an envelope peak value. When a phase noise of two oscillators 103A, 103B is respectively ΦA(t), ΦB(t), RMS value of a jitter (jitter of $t_n$–nTb of deviation amount from periodicity) of an envelope peak value is indicated in the following formula (1).

$$T_b\sqrt{\left(<(\Phi B(t) - \Phi A(t))^2>\right)}/2\pi \tag{1}$$

Here, < > is a time average.

Here, even when assuming that the reference oscillator 104 is an ideal oscillator with no noise, due to a limitation in a noise of a phase comparator and a limitation in a control band of a phase synchronization, a phase noise with no correlation remains. When a phase noise of two oscillators 103A, 103B is respectively ΦA(t), ΦB(t), RMS value of a jitter of $t_n$–nTb will be the following formula (2), as there is no correlation between ΦA(t) and ΦB(t).

$$T_b\sqrt{\left(<(\Phi B(t) - \Phi A(t))^2>\right)}/2\pi = \tag{2}$$
$$T_b\sqrt{\left(<\Phi B(t)^2> + <\Phi A(t)^2> -2<\Phi B(t)\Phi A(t)>\right)}/2\pi =$$
$$T_b\sqrt{\left(<\Phi B(t)^2> + <\Phi A(t)^2>\right)}/2\pi$$

Here, as an example of a phase noise of a typical oscillator, about Ultra Herley Series PCRO, Ultra Herley Series PDRO, and Ultra Herley Series PXS made by Ultra Herley, phase noise characteristics of each oscillator plotted by referring to a data of Non-Patent Document 1 is illustrated in FIG. 3. When designing a system with high performance, an oscillator with extremely low phase noise is selected, and this product is an oscillator with extremely low phase noise.

When fm=25 GHz, a phase noise of the oscillators 103A, 103B corresponds to a phase noise of an oscillator of 26 GHz (Ultra Herley Series PDRO) illustrated in FIG. 3. This phase noise is −110 dBc/Hz or more at least until 100 kHz. When there are no correlation respectively, a relative phase noise of fm and fm+Δf is considered to be about +3 dB illustrated as a characteristic of PDRO.

As indicated in the following formula (3), RMS value of a phase noise of a phase difference will be −57 dBc, even calculating by considering only integration of phase noise until 100 kHz.

$$-110 \text{ dBc/Hz} + 3 \text{ dB} + 10\text{Log}_{10}(100 \text{ kHz}) = -57 \text{ dBc} \tag{3}$$

The RMS value −57 dBc of the phase noise of the phase difference corresponds to 14 ns in RMS value as a jitter of an interference waveform when Tb=101 μs, and comparable to correspond to 6 μm when converted into a distance measurement when fm=25 GHz.

Therefore, in an optical comb distance meter, in order to reduce variations of measurement, it is essentially required to reduce ΦA(t)−ΦB(t) indicated in the formula (1).

In technologies disclosed in Patent Document 1 and Patent Document 2, by using a difference of an envelope peak of an interference waveform by using a measuring light detector and an interferometer including a distance to be measured, and a system for measuring an envelope peak using a reference light detector and an interferometer with a reference surface, an influence of a phase noise is reduced.

Patent Document 1: JP 5231883 B
Patent Document 2: JP 2020-008357 A
Non-Patent Document 1: Ultra Herley, https://www.ultra-herley.com/uploads/herley/datasheets/cti/Ultra%20Herley %20Series %20PDRO.pdf https://www.ultra-herley.com/uploads/herley/datasheets/cti/Ultra%20Herley %20Series %20PCRO.pdf https://www.ultra-herley.com/uploads/herley/datasheets/cti/Ultra%20Herley %20Series %20PXS .pdf Non-Patent Document 2: Analog devices, https://www.analog.com/media/jp/analog-dialogue/volume-51/number-3/articles/improved-dac-phase-noise-measurements-enable-ultra-low-phase-noise-dds-applications_jp.pdf

SUMMARY OF THE INVENTION

In an optical comb distance meter disclosed in Patent Document 1, a frequency of two oscillators 103A, 103B is high frequency as $f_m$=25 GHz. In a phase synchronization of an oscillator with such high frequency using a reference signal with low frequency (for example, 10 MHz), a frequency division ratio of a phase comparator will be large, and a noise of the phase comparator will be large. Also, even when it is controlled to a noise level of the phase comparator, noises between phase comparators are uncorrelated, so phase noises of two oscillators are uncorrelated. Also, a control in wide band will be a cause for enlarging a phase noise of an oscillator conversely, so there is an optimum value in a control band.

However, in Patent Document 1, it is strongly recognized that a relative stability of a driving signal source of multiple optical combs is important, but it is only described that a pair of oscillators with a phase-locked loop of wide band is required, and a means for achieving it is not indicated.

Here, a purpose of the present invention is to provide a low relative phase noise optical comb generation device in which a repetitive frequency of an interference signal of an optical comb is stabilized by reducing a relative phase noise of driving signals with different frequencies for driving multiple optical comb generators in an optical comb distance meter, by considering conventional circumstances as the above.

Also, other purpose of the present invention is to reduce variations of measurement of a distance meter, a shape measuring device, or the like, and to accelerate the measurement.

Other purpose of the present invention, and concrete advantages obtained by the present invention will be clearer from an explanation of embodiments explained in below.

In the present invention, a repetitive frequency of an interference signal of an optical comb is stabilized by reducing a relative phase noise of driving signals with different frequencies for driving multiple optical comb generators in an optical comb distance meter.

That is, the present invention is a low relative phase noise optical comb generation device, comprising: at least three oscillators for generating frequency signals with mutually different frequencies; at least two frequency converters to which a frequency signal obtained by one oscillator of the at least three oscillators and respective frequency signals obtained by respective oscillators other than the one oscillator are input; and at least two optical comb generators to which at least two types of modulation signals with mutually different frequencies converted by the at least two frequency converters are supplied, wherein the at least two frequency converters supply the at least two types of modulation signals, in which a relative phase noise is reduced respectively as a sum frequency signal or a difference frequency signal of the frequency signal by the one oscillator and a frequency signal by other oscillator, to the at least two optical comb generators as driving signals.

In the low relative phase noise optical comb generation device relating to the present invention, the respective oscillators other than the one oscillator of the at least three oscillators are having a phase noise lower than a phase noise of the one oscillator.

In the low relative phase noise optical comb generation device relating to the present invention, the at least three oscillators generate frequency signals with mutually different frequencies phase locked to a reference frequency signal given by a reference oscillator.

In the low relative phase noise optical comb generation device relating to the present invention, the at least two frequency converters are respectively a frequency mixer.

Also, in the low relative phase noise optical comb generation device relating to the present invention, the at least two frequency converters are respectively composed of a frequency mixer, a phase comparator, and a voltage-controlled oscillator.

Also, in the low relative phase noise optical comb generation device relating to the present invention, the modulation signals are supplied as driving signals from the at least two frequency converters to the at least two optical comb generators respectively via a band pass filter.

Also, in the low relative phase noise optical comb generation device relating to the present invention, the frequency signal obtained by the one oscillator is input to the at least two frequency converters respectively via an isolator.

Also, in the low relative phase noise optical comb generation device relating to the present invention, the at least three oscillators generate at least three types of frequency signals respectively in a state that a frequency is fixed to a frequency phase locked to the reference frequency signal by a PLL circuit.

Also, in the low relative phase noise optical comb generation device relating to the present invention, the respective oscillators other than the one oscillator of the at least three oscillators are respective direct digital synthesizer (DDS) oscillators driven by a clock phase locked to the reference frequency signal.

Also, the low relative phase noise optical comb generation device relating to the present invention comprises: three oscillators for generating frequency signals with mutually different frequencies phase locked to the reference frequency signal; two frequency converters; and two optical comb generators, and two types of modulation signals with reduced relative phase noise obtained by the two frequency converters are supplied to the two optical comb generators as driving signals.

Further, the low relative phase noise optical comb generation device relating to the present invention, comprises: (X+Y) oscillators for generating frequency signals with mutually different frequencies phase locked to the reference frequency signal; XY frequency converters; and Y optical comb generators, wherein X is an integer of 1 or more and Y is an integer of two or more, and a basic structure composed of (Y+1) oscillators, Y frequency converters, and Y optical comb generators is multiplexed by X.

In the present invention, a low relative phase noise optical comb generation device in which a repetitive frequency of an interference signal of an optical comb is stabilized can be provided by supplying modulation signals with reduced relative phase noise as a sum frequency signal or a difference frequency signal of a frequency signal obtained by one oscillator and a frequency signal obtained by other oscillator with a lower phase noise to two optical comb generators as driving signals.

In the present invention, a relative phase noise of driving signals with different frequencies for driving multiple optical comb generators is reduced, a repetitive frequency of an interference signal of an optical comb is stabilized, variations of measurement of a distance meter, a shape measuring device, or the like is reduced, and the measurement is accelerated.

BRIEF DESCRIPTION OF THE DRAWINGS

FIG. 6 is a block diagram illustrating other example of a low relative phase noise optical comb generation device applying the present invention.

DETAILED DESCRIPTION OF THE INVENTION

Figure 1:
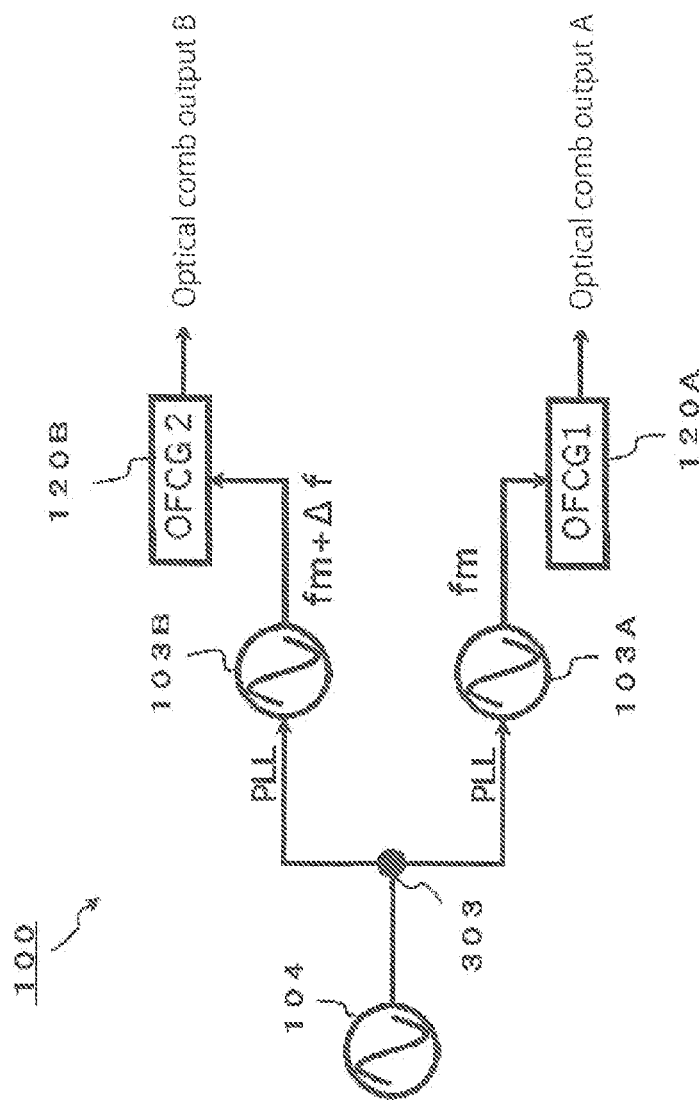
FIG. 1 is a block diagram illustrating a structure of a conventional optical comb driving circuit.
Figure 2:
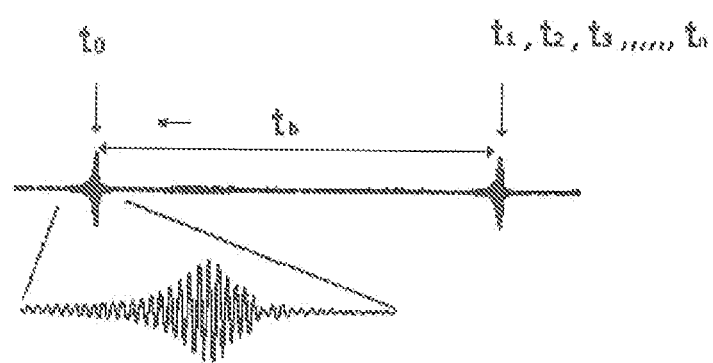
FIG. 2 is a waveform chart of detection output obtained by detecting with an optical detector by interfering an output of an optical comb generator driven by an optical comb driving circuit.

Hereinafter, explaining in detail about preferred embodiments of the present invention, with reference to the drawings. In addition, about common components, it is explained by giving common reference number in the drawings. Also, the present invention should not be limited to the following examples, it goes without saying that it can be changed optionally within a scope not deviating from a gist of the present invention.

Figure 4:
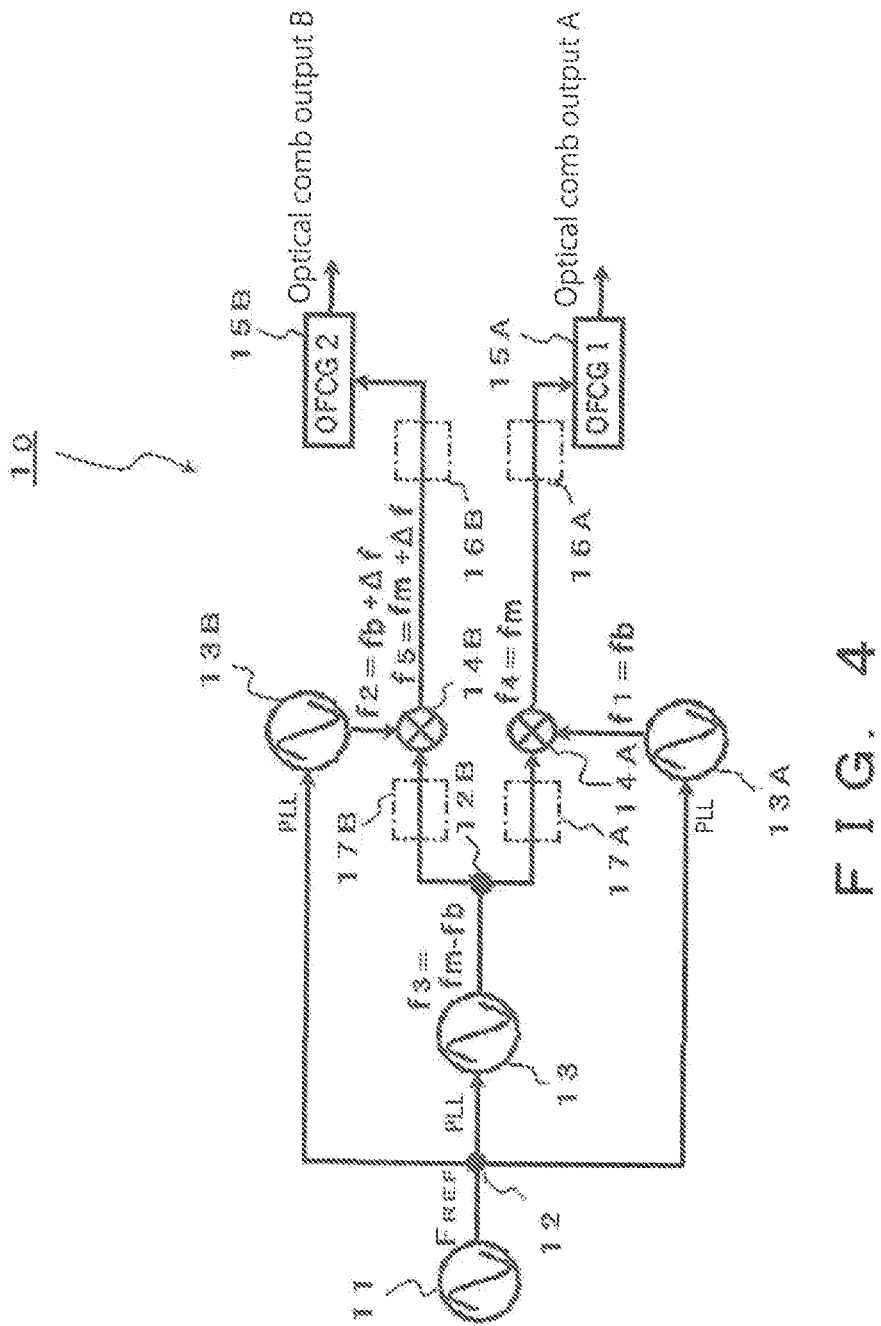
FIG. 4 is a block diagram illustrating an example of a low relative phase noise optical comb generation device applying the present invention.

For example, as illustrated in a block diagram of FIG. 4, the present invention is applied to a low relative phase noise optical comb generation device 10 comprising two optical comb generators 15A, 15B for emitting a reference light and a measuring light with a coherence and mutually different modulation cycles, respectively modulated of its phase or intensity periodically.

This low relative phase noise optical comb generation device 10 is used as a light source for emitting a reference light and a measuring light with a coherence and mutually different modulation cycles, respectively modulated of its phase or intensity periodically, in a three-dimensional profiler or an optical comb distance meter for measuring a distance from a time difference of an interference signal of a reference light and an interference signal of a measuring light, for example as described in Patent Document 1, Patent Document 2, and else.

This low relative phase noise optical comb generation device 10 comprises: three oscillators 13A, 13B, 13 to which a reference frequency signal FREF is supplied from a reference oscillator 11 via a power divider 12A with three branches; two frequency converters 14A, 14B to which a third frequency signal is supplied from a third oscillator 13 via a power divider 12B with two branches, wherein, by supplying a first frequency signal from a first oscillator 13A to a first frequency converter 14A, and by supplying a second frequency signal from a second oscillator 13B to a second frequency converter 14B, a first modulation signal in which a frequency is converted to a sum frequency f1+f3 of a frequency f1 of the first frequency signal and a frequency f3 of the third frequency signal by the first frequency converter 14A is obtained, and also, a second modulation signal in which a frequency is converted to a sum frequency f2+f3 of a frequency f2 of the second frequency signal and the frequency f3 of the third frequency signal by the second frequency converter 14B is obtained, and the first modulation signal obtained by the first frequency converter 14A is supplied to a first optical comb generator 15A, and also, the second modulation signal obtained by the second frequency converter 14B is supplied to a second optical comb generator 15B.

The three oscillators 13A, 13B, 13 generate frequency signals with three types of mutually different frequencies fb, fb+Δf, fm−fb phase locked to the reference frequency signal FREF given by the reference oscillator 11, for example by PLL (Phase-Locked Loop).

As the above, when the frequency f1 of the first frequency signal output by the first oscillator 13A is fb, when the frequency f2 of the second frequency signal output by the second oscillator 13B is fb+Δf, and when the frequency f3 of the third frequency signal output by the third oscillator 13 is fm−fb, the sum frequency f1+f3 of the first frequency signal and the third frequency signal will be fm by the first frequency converter 14A, and the first modulation signal with a frequency fm is obtained by the first frequency converter 14A, and also, the sum frequency f2+f3 of the second frequency signal and the third frequency signal will be fm+Δf by the second frequency converter 14B, and the second modulation signal with a frequency fm+Δf is obtained by the second frequency converter 14B.

Two oscillators 13A, 13B other than the third oscillator 13 of the three oscillators 13A, 13B, 13 are having a phase noise lower than a phase noise of the third oscillator 13.

A phase noise of the three oscillators 13A, 13B, 13 is respectively Φa(t), Φb(t), and ΦC(t). Here, an average value is 0. All of them are assumed to be uncorrelated respectively.

The frequency converters 14A, 14B respectively generates a sum frequency signal or a difference frequency signal of the third frequency signal and other frequency signal with a phase noise lower than a phase noise of the third frequency signal which are input respectively. In other words, the frequency converters 14A, 14B are having a function to perform an addition or a subtraction of frequencies.

And when the frequency converters 14A, 14B are adders, a phase noise ΦA(t) of a signal with a frequency fm obtained by the first frequency converter 14A will be as the following formula (4).

$$\Phi A(t) = \Phi C(t) + \Phi a(t) \tag{4}$$

Also, a phase noise $\Phi B(t)$ of a signal with a frequency fm+$\Delta$f obtained by the second frequency converter 14B will be as the following formula (5).

$$\Phi B(t) = \Phi C(t) + \Phi b(t) \qquad (5)$$

When this is assigned to the above formula (1), RMS value of a jitter of $t_n$−nTb will be as the following formula (6).

$$T_b \sqrt{\left( < (\Phi C(t) + \Phi b(t) - \Phi C(t) - \Phi a(t))^2 > \right) / 2\pi} = \qquad (6)$$
$$T_b \sqrt{\left( < \Phi b(t)^2 > + < \Phi a(t)^2 > \right) / 2\pi}$$

The above formula (6) is a calculation when a distance to be measured is 0. It may be considered as a calculation of a system for measuring an envelope peak using a reference light detector of technologies disclosed in Patent Document 1 and Patent Document 2. In a system for detecting an envelope peak of an interference waveform using a measuring light detector and an interferometer including a distance to be measured, a time delay $\tau$ of a distance to be measured should be considered. When considering a time delay $\tau$ of a distance to be measured, the formula (6) can be rewritten as the following formula (7).

$$T_b \sqrt{\left( < (\Phi C(t) + \Phi b(t) - \Phi C(t-\tau) - \Phi a(t-\tau))^2 > \right) / 2\pi} = \qquad (7)$$
$$T_b \sqrt{\left( 2 < \Phi C(t)^2 > -2 < \Phi C(t)\Phi C(t-\tau) > + < \Phi b(t)^2 > + < \Phi a(t)^2 > \right) /} 2\pi$$

Here, <$\Phi C(t)$ $\Phi C(t)$−$\tau$> is an autocorrelation function of a phase noise of the oscillator 13. In a range of $\tau$ with large autocorrelation, a member of 2><$\Phi C(t)^2$>−2<$\Phi C(t)$ $\Phi C(t)$−$\tau$> will be a small value. In below, $\tau$ is discussed as approximated to 0.

In other words, a jitter is determined by a phase noise $\Phi a(t)$ of the first frequency signal with a frequency fb and a phase noise $\Phi b(t)$ of the second frequency signal with a frequency fb+$\Delta$f, and determined by a phase noise $\Phi a(t)$ of the first frequency signal with a frequency f1(fb) output by the first oscillator 13A and a phase noise $\Phi b(t)$ of the second frequency signal with a frequency f2(fb+$\Delta$f) output by the second oscillator 13B.

Figure 3:
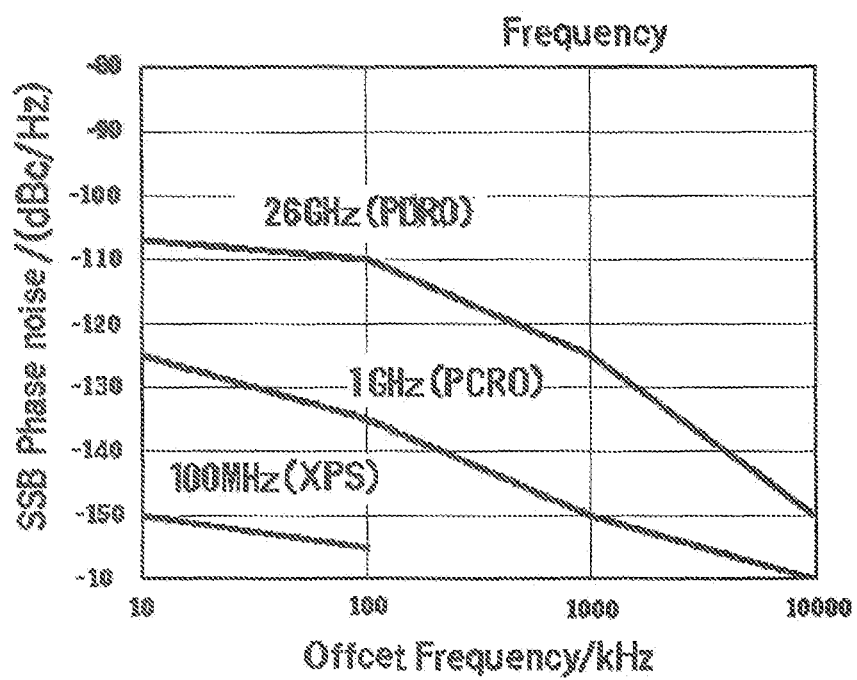
FIG. 3 is a characteristic chart illustrating a phase noise of respective oscillators plotted by referring to a data of Patent Document 1.

Therefore, even when fm=25 GHz, for example when fb and fb+$\Delta$f are about 1 GHz, a phase noise level of $\Phi a(t)$ and $\Phi b(t)$ is reduced to a level corresponding to a characteristic of PCRO illustrated in FIG. 3, and an improvement of a relative phase noise of about 20 dB is expected in a range of offset frequency 1 MHz of FIG. 3.

Further, when fb and fb+$\Delta$f are about 100 MHz, it will be a level corresponding to characteristic of XPS illustrated in FIG. 3, and an improvement of a relative phase noise of 40 dB or more is expected.

Here, in the low relative phase noise optical comb generation device 10, the frequency converters 14A, 14B were explained as to perform an addition of frequencies, but it may perform a subtraction of frequencies. In this case, by setting a frequency f3 of the third frequency signal generated by the third oscillator 13 to fm+fb, by setting a frequency f1 of the first frequency signal generated by the first oscillator 13A to fb, and by setting a frequency f2 of the second frequency signal generated by the second oscillator 13B to fb−$\Delta$f, and by performing a subtraction of frequencies in the frequency converters 14A, 14B, a first modulation signal with a frequency fm is obtained by a first frequency converter 14A, and also, a difference frequency f2−f3 of the second frequency signal and the third frequency signal will be fm+$\Delta$f, and a second modulation signal with a frequency fm+$\Delta$f is obtained by a second frequency converter 14B.

Figure 5:
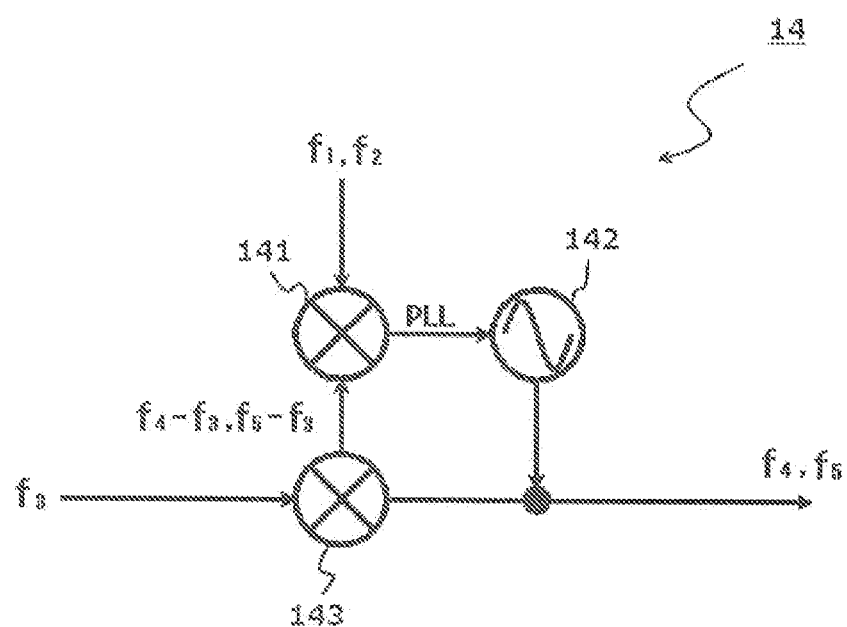
FIG. 5 is a block diagram illustrating an example of a frequency converter in the optical comb generation device.

In the low relative phase noise optical comb generation device 10, as the frequency converters 14A, 14B, a frequency mixer such as a diode, a double balanced mixer, and an IQ mixer, or a frequency converter 14 using a phase synchronization with a structure as illustrated in FIG. 5 can be used.

Here, when a frequency mixer such as a diode, a double balanced mixer, and an IQ mixer is used as the frequency converters 14A, 14B, as the frequency mixer is a nonlinear element, frequency components other than necessary frequency components will be generated, so as illustrated as a block of a dashed line in FIG. 4, band pass filters 16A, 16B are respectively inserted at output side of the frequency converters 14A, 14B to supply only necessary frequency components to the optical comb generators 15A, 15B as driving signals.

For example, in the first frequency converter 14A using the frequency mixer, not only necessary frequency components fm, but also a spurious of undesired frequency components fm+Mfb (excluding M=0) will be generated. Here, M is an integer. When the undesired frequency components are mixed to the first modulation signal supplied to a first optical comb generator 15A as a driving signal, it will be a spurious in an optical comb generation by the first optical comb generator 15A, and it may influence a measurement value. A band pass filter 16A is used to avoid this influence by passing through only necessary frequency components fm and attenuates other frequency components to the extent that it will not influence a measurement specification.

Also, the undesired frequency components fm+Mfb generated by the first frequency converter 14A using the frequency mixer propagate in a direction of a power divider 12B at input side, and the power divider 12B is also not having an ideal characteristic, so it reaches the second frequency converter 14B. By converting a frequency of the undesired frequency components fm+Mfb reached the second frequency converter 14B, frequency components fm+Mfb+M' (fb+$\Delta$f) will be mixed to an output of the second frequency converter 14B.

Here, M' is an integer. Frequency components other than M+M'=0 will be outside of a range from fm to +fb or −fb, so it can be attenuated by the band pass filter 16A for passing through a necessary frequency fm+$\Delta$f. However, frequency components of M+M'=0 will be fm+M' Of, and it will be frequency components extremely near fm+$\Delta$fm of necessary M'=1, so it is difficult to eliminate by the band pass filter 16A. Therefore, as illustrated as a block of a dashed line in FIG. 4, by inserting isolators 17A, 17B respectively at input side, reflection components by the frequency converters 14A, 14B can be attenuated.

As the isolators 17A, 17B, a microwave amplifier with large reverse isolation, a Pi-pad attenuator or a T-pad attenuator, an isolation element such as a microwave isolator using ferrite, and an isolation circuit combining a variable attenuator and a band pass filter, or an isolation circuit combining an isolation amplifier and a resistance attenuator or a band pass filter, can be used.

Also, a frequency f3 of the third frequency signal output from the third oscillator 13 is changed to (fm−fb)/P, and by inserting frequency multipliers with a multiplication number P at input side of the frequency converters 14A, 14B instead of the isolators 17A, 17B, an influence of reflection components by the frequency converters 14A, 14B will be reduced.

In other words, by respective frequency multipliers, by inputting a frequency (fm−fb)/P of the third frequency signal supplied from the third oscillator 13 via the power divider 12B multiplied by P to the frequency converters 14A, 14B, a first modulation signal with a frequency fm is obtained by the first frequency converter 14A, and also, a second modulation signal with a frequency fm+Δf is obtained by the second frequency converter 14B.

Even when unnecessary frequency components fm+Mfb generated by the second frequency converter 14B are propagated, the frequency multipliers are having a small effect as a frequency divider. In other words, there is high isolation effect, so an amount of frequency components near (fm−fb)/P reaching the first frequency converter 14A via a band pass filter will be extremely small.

Further, by inserting a band pass filter passing through only frequency f3 components of the third frequency signal generated by the third oscillator 13 at output side of the power divider 12B, an influence of reflection components by the frequency converters 14A, 14B will be reduced.

In other words, by the band pass filter, only frequency f3 components of the third frequency signal generated by the third oscillator 13, i.e. frequency components of (fm−fb), will be passed through it, and when using the frequency multipliers, only frequency components of (fm−fb)/P will be passed through it, and other frequency components can be attenuated to the extent that it will not influence a measurement specification. For example, even when frequency components of (fm−fb) or frequency components of (fm−fb)/P reached to the first frequency converter 14A, it is same as frequency f3 of the third frequency signal generated by the third oscillator 13, so unnecessary spurious components will not be generated.

In the low relative phase noise optical comb generation device 10, practically, these features will be combined and an optimum structure with improved performance will be adopted.

In addition, in the low relative phase noise optical comb generation device 10, when fb and fb+Δf are about 100 MHz, an improvement of a relative phase noise of 40 dB or more is expected, but when fb=100 MHz and $f_m$=25 GHz, as the band pass filters 16A, 16B, a filter with extremely high Q value of 2500 or more will be required for reducing spurious of $f_m$+fb or $f_m$−fb.

Here, as the frequency converters 14A, 14B, not only a frequency mixer such as a diode, a double balanced mixer, and an IQ mixer, but also, a frequency converter 14 using a phase synchronization with a structure as illustrated in FIG. 5 may be used.

This frequency converter 14 comprises: a phase comparator 141; a voltage-controlled oscillator 142 in which an oscillation phase is controlled by the phase comparator 141; and a frequency mixer 143 to which frequency signals output from the voltage-controlled oscillator 142 will be input after being branched.

In this frequency converter 14, in the frequency mixer 143, the third frequency signal with a frequency f3, i.e. fm−fb, obtained by the third oscillator 13 is input to the frequency mixer 143, and when it is used for example as the frequency converter 14A, the first frequency signal with a frequency f1, i.e. fb, obtained by the first oscillator 13A is input to the phase comparator 141, and the fourth frequency signal with a frequency f4, i.e. fm, is output from the voltage-controlled oscillator 142.

The frequency mixer 143 inputs a frequency signal with a difference frequency f4−f3=fb of a frequency f4, i.e. fm, of the fourth frequency signal and a frequency f3, i.e. fm−fb, of the third frequency signal to the phase comparator 141.

In the phase comparator 141, by controlling an oscillation phase of the voltage-controlled oscillator 142 by performing a phase synchronization of the frequency signal with the difference frequency fb and the first frequency signal with the frequency f1, i.e. fb, and by feeding it back to the voltage-controlled oscillator 142, the fourth frequency signal with the frequency f4, i.e. fm, in which a phase is synchronized to the third frequency signal with the frequency f3, i.e. fm−fb, is obtained by the voltage-controlled oscillator 142.

Also, when this frequency converter 14 is used as the frequency converter 14B, by inputting the second frequency signal with a frequency f2, i.e. fb+Δf, obtained by the second oscillator 13B to the phase comparator 141, an oscillation phase of the voltage-controlled oscillator 142 is controlled such that a difference frequency f5−f3 of a frequency f5 of a fifth frequency signal obtained by the voltage-controlled oscillator 142 and the frequency f3 of the third frequency signal coincides with the frequency f2 of the second frequency signal, $$f5 = f2 + f3 = (fb + \Delta f) + (fm - fb) = fm + \Delta f$$

and the fifth frequency signal with the frequency f5, i.e. fm+Δf, in which a phase is synchronized to the third frequency signal with the frequency f3, i.e. fm−fb, is obtained by the voltage-controlled oscillator 142.

Here, the phase comparator 141 is a phase comparator such as a double balanced mixer, and it is having a low noise as it performs a phase comparison of identical frequencies. Also, a control band can be large, for example as 10 MHz or more, as a frequency comparison is performed with a frequency fb. Therefore, a relative phase noise of outputs of the frequency converters 14A, 14B will be equal to a relative phase noise of the fourth frequency signal with the frequency fb and the fifth frequency signal with the frequency fb+Δf.

Also, an output of the frequency converter 14 is sufficiently larger than a control band of a phase synchronization of the fourth frequency signal with the frequency fb or the fifth frequency signal with the frequency fb+Δf, so a spurious fm or a spurious fm+fb of the voltage-controlled oscillator 142 will be small.

Therefore, by using the frequency converter 14 using the phase synchronization as the frequency converters 14A, 14B, the band pass filters 16A, 16B at output side will be unnecessary, or a specification can be reduced.

Also, by reducing a relative phase noise at generation stage of frequency fb and frequency fb+Δf, by duplexing a structure of the low relative phase noise optical comb generation device 10 illustrated in the block diagram of FIG. 4, a specification of the band pass filters 16A, 16B can be attenuated.

A low relative phase noise optical comb generation device 20 illustrated in a block diagram of FIG. 6 comprises: four oscillators 13, 23, 23A, 23B for generating frequency signals with mutually different frequencies phase locked to a reference frequency signal given by the reference oscillator 11; four frequency converters 14A, 14B, 24A, 24B; and two optical comb generators 15A, 15B, and a structure of the low relative phase noise optical comb generation device 10 is duplexed.

In addition, in the low relative phase noise optical comb generation device 20, about the components identical with the components of the low relative phase noise optical comb generation device 10, identical reference numbers are given, and detailed explanations are omitted.

That is, the low relative phase noise optical comb generation device 20 comprises: four oscillators 23A, 23B, 13, 23 to which a reference frequency signal FREF is supplied from a reference oscillator 11 via a power divider 22A with four branches; first and second frequency converters 14A, 14B to which a third frequency signal is supplied from a third oscillator 13 via a power divider 12B with two branches; and third and fourth frequency converters 24A, 24B to which a eighth frequency signal is supplied from an eighth oscillator 23 via a power divider 22B with two branches.

And, in the low relative phase noise optical comb generation device 20, by supplying a sixth frequency signal from a fourth oscillator 23A to a third frequency converter 24A, and by supplying a seventh frequency signal from a fifth oscillator 23B to a fourth frequency converter 24B, a ninth frequency signal in which a frequency f9=f6+f8 is converted to a sum frequency f6+f8 of a frequency f6 of the sixth frequency signal and a frequency f8 of the eighth frequency signal by the third frequency converter 24A is obtained, and also, a tenth frequency signal in which a frequency f10=f7+f8 is converted to a sum frequency f7+f8 of a frequency f7 of the seventh frequency signal and the frequency f8 of the eighth frequency signal by the fourth frequency converter 24B is obtained, and the ninth frequency signal obtained by the third frequency converter 24A is supplied to a first frequency converter 14A, and also, the tenth frequency signal obtained by the fourth frequency converter 24B is supplied to a second frequency converter 14B.

Here, in the four oscillators 23A, 23B, 13, 23, an oscillation frequency is fixed by phase locked to the reference frequency signal FREF for example with a frequency of 10 MHz given by the reference oscillator 11, the third oscillator 13 outputs the third frequency signal with the frequency f3=fm−fb, the eighth oscillator 23 outputs the eighth frequency signal with the frequency f8=fb−fc, the fourth oscillator 23A outputs the sixth frequency signal with the frequency f6=fc, and the fifth oscillator 23B outputs the seventh frequency signal with the frequency f7=fc+Δf.

In the low relative phase noise optical comb generation device 20, by supplying the ninth frequency signal with the frequency f9 from the third frequency converter 24A to the first frequency converter 14A, $$f9 = f6 + f8 = fb - fc + fc = fb$$

a first modulation signal with a sum frequency f4 of the frequency f3=fm−fb of the third frequency signal given by the third oscillator 13 and the frequency f9 of the ninth frequency signal $$f4 = f3 + f9 = fm - fb + fb = fm$$

is supplied to the first optical comb generator 15A as a driving signal.

Also, by supplying the tenth frequency signal with the frequency f10 from the fourth frequency converter 24B to the second frequency converter 14B, $$F10 = f7 + f8 = (fc + \Delta f) + (fb - fc) = fb + \Delta f$$

a second modulation signal with a sum frequency f5 of the frequency f3=fm−fb of the third frequency signal given by the third oscillator 13 and the frequency f10 of the tenth frequency signal $$f5 = f3 + f10 = (fm - fb) + (fb + \Delta f) = fm + \Delta f$$

is supplied to the second optical comb generator 15B as a driving signal.

Here, the frequency f10, i.e. fb+Δf, of the tenth frequency signal supplied from the fourth frequency converter 24B to the second frequency converter 14B is 1 GHz+500 kHz, and fc is 100 MHz.

In the low relative phase noise optical comb generation device 20, a relative phase noise of the driving signals is determined by the fourth and fifth oscillators 23A, 23B supplying the driving signals to the first and second optical comb generators 15A, 15B instead of the first and second oscillators 13A, 13B in the low relative phase noise optical comb generation device 10. Even when fb is 1 GHz, fc is 100 MHz, so its ratio is about 10. Therefore, unnecessary frequency components can be removed easily by inserting band pass filters 26A, 26B at the third and fourth frequency converters 24A, 24B.

A phase noise of the four oscillators 23A, 23B, 13, 23 is respectively Φc(t), Φd(t), ΦC(t), ΦD(t). Here, an average value is 0. It is assumed that they are all uncorrelated respectively.

When the third and fourth frequency converters 24A, 24B are adders, a phase noise Φa(t) of the ninth frequency signal with the frequency fb obtained by the third frequency converter 24A and a phase noise Φb(t) of the tenth frequency signal with the frequency fb+Δf obtained by the fourth frequency converter 24B will be as the following formula (8) and formula (9) respectively.

$$\Phi a(t) = \Phi D(t) + \Phi c(t) \quad (8)$$

$$\Phi b(t) = \Phi D(t) + \Phi d(t) \quad (9)$$

When this is assigned to the above formula (6), RMS value of a jitter of $t_n - nTb$ will be as the following formula (10).

$$T_b\sqrt{(<(\Phi C(t) + (\Phi D(t) + \Phi d(t)) - \Phi C(t) - (\Phi D(t) + \Phi c(t)))^2>)}/2\pi = \quad (10)$$
$$T_b\sqrt{(<\Phi d(t)^2> + <\Phi c(t)^2>)}/2\pi$$

Here, a phase noise of Φc(t), Φd(t) will be in a level corresponding to a characteristic of an oscillator XPS of 100 MHz illustrated in FIG. 3, an improvement of a relative phase noise of 40 dB or more is expected compared to a phase noise of 25 GHz.

The low relative phase noise optical comb generation device 20 is duplexing a basic structure of the low relative phase noise optical comb generation device 10 illustrated in the block diagram of FIG. 4, but three or more optical comb generators may be arranged, and also, X may be an integer of one or more and Y may be an integer of two or more, and by comprising (X+Y) oscillators for generating frequency signals with mutually different frequencies phase locked to the reference frequency signal; XY frequency converters; and Y optical comb generators, a basic structure composed of (Y+1) oscillators, Y frequency converters, and Y optical comb generators is multiplexed by X.

For example, when X=3 and Y=3, and by comprising six oscillators, nine frequency converters, and three optical comb generators, a low relative phase noise optical comb generation device in which a basic structure composed of four oscillators, three frequency converters, and three optical comb generators is multiplexed by three is configured.

Also, in a low relative phase noise optical comb generation device multiplexed by X, when comprising oscillators with same oscillation frequency, for example in the low relative phase noise optical comb generation device 20, when the third and eighth oscillators 13, 23 are having same oscillation frequency, the third oscillator 13 can be combined to the eighth oscillator 23 and a number of oscillators can be reduced.

Here, in the low relative phase noise optical comb generation device 10 illustrated in the block diagram of FIG. 4, in the first and second oscillators 13A, 13B, the first and second frequency signals with mutually different frequencies phase locked to the reference frequency signal F REF given by the reference oscillator 11 by PLL are generated, but DDS (Direct Digital Synthesizer) oscillator may be adopted.

DDS is a high speed signal generator operating with a system clock of a frequency higher than an output frequency, and a frequency of a half or less of a system clock can be output in principle from a Nyquist theorem. DDS may be considered as a kind of a frequency divider, and a frequency division ratio is not required to be an integer value. A phase noise of DDS output is determined by a system clock and reduced for a frequency division ratio. A relative phase noise of multiple DDS outputs operating with same system clock is smaller than an absolute phase noise (for example, refer to Non-Patent Document 2). By using DDS oscillators operating with same system clock as signal sources of fm, fm+Δf, fb, fb+Δf or fc, fc+Δf, a relative phase noise will be reduced.

Figure 7:
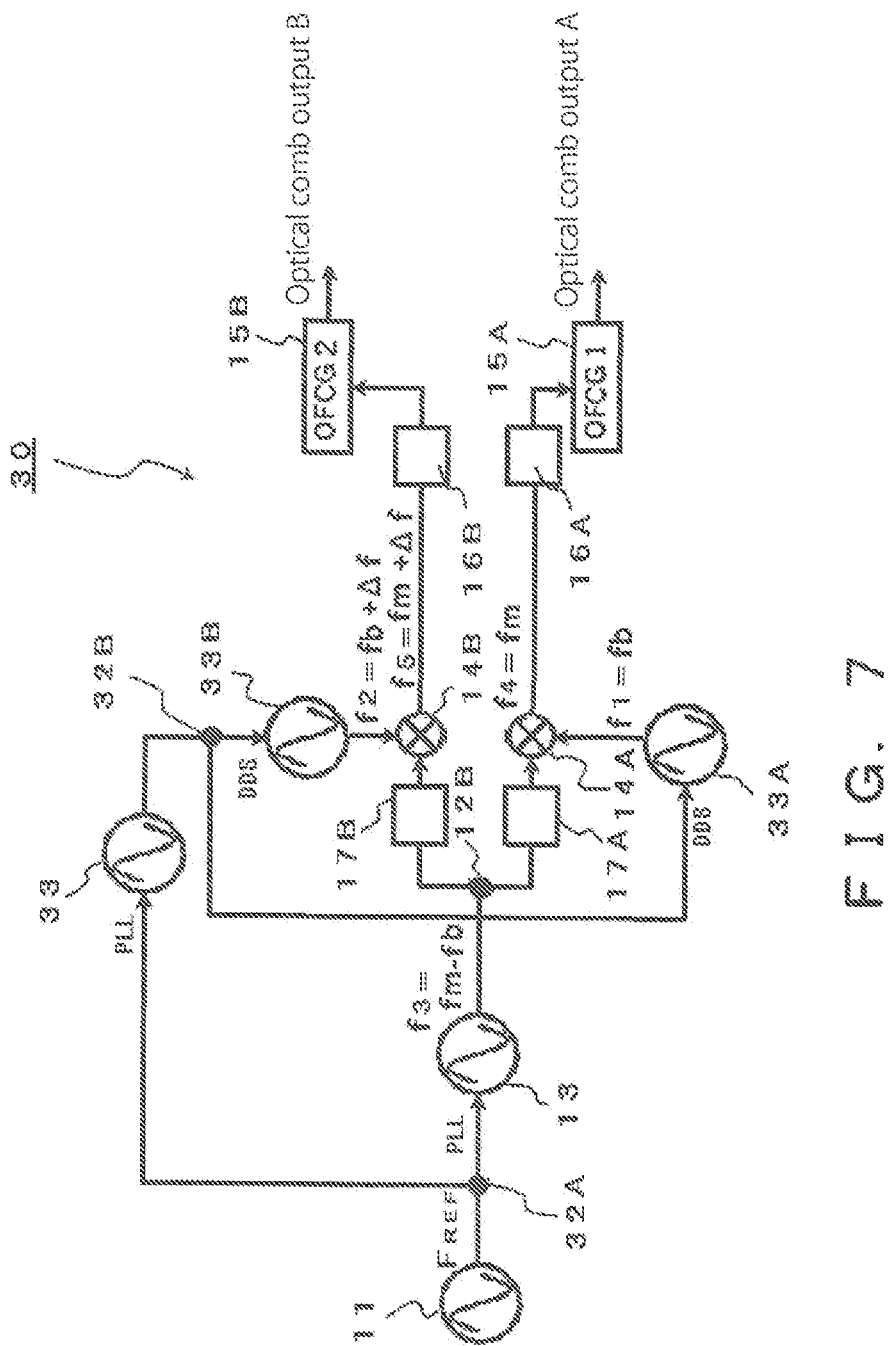
FIG. 7 is a block diagram illustrating other example of a low relative phase noise optical comb generation device applying the present invention.

In a low relative phase noise optical comb generation device 30 illustrated in FIG. 7, the first and second oscillators 13A, 13B in the low relative phase noise optical comb generation device 10 is replaced with DDS oscillators 33A, 33B, and it comprises an oscillator 33 for generating a system clock phase locked to the reference frequency signal FREF given by the reference oscillator 11 via a power divider 32A with two branches by PLL, and the system clock obtained by the oscillator 33 is supplied to the DDS oscillators 33A, 33B via a power divider 32B with two branches. The DDS oscillators 33A, 33B are driven by identical system clock phase locked to the reference frequency signal FREF, so it generates a first modulation signal with a frequency fm and a second modulation signal with a frequency fm+Δf, in which a relative phase noise is reduced less than a relative phase noise corresponding to the low relative phase noise optical comb generation device 10, and supplies the modulation signals to the optical comb generators 15A, 15B.

In addition, in the low relative phase noise optical comb generation device 30, about the components identical with the components of the low relative phase noise optical comb generation device 10, identical reference numbers are given, and detailed explanations are omitted.

Figure 8:
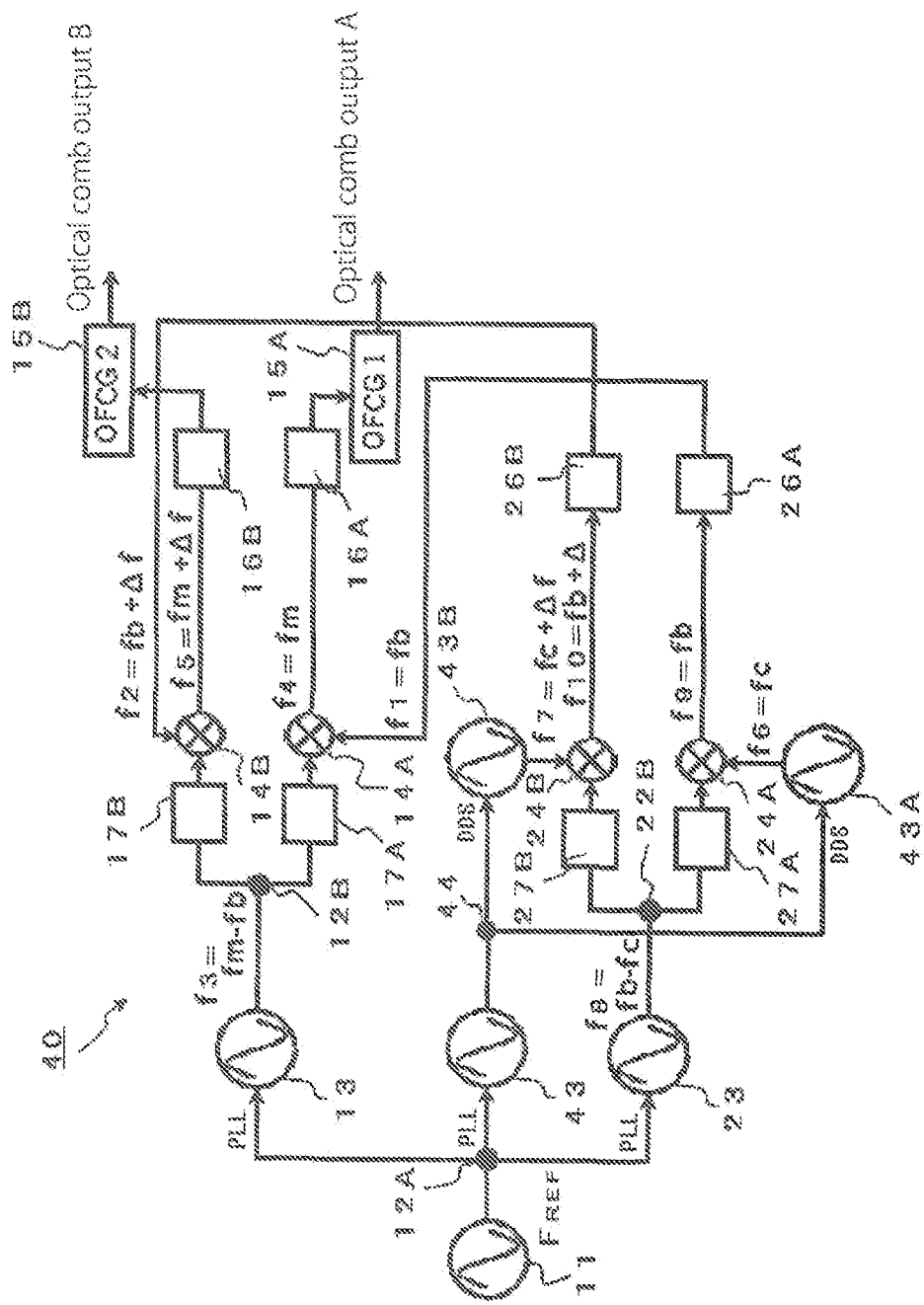
FIG. 8 is a block diagram illustrating other example of a low relative phase noise optical comb generation device applying the present invention.

Also, in a low relative phase noise optical comb generation device 40 illustrated in FIG. 8, the fourth and fifth oscillators 23A, 23B in the low relative phase noise optical comb generation device 20 is replaced with DDS oscillators 43A, 43B, and it comprises an oscillator 43 for generating a system clock phase locked to the reference frequency signal FREF given by the reference oscillator 11 via the power divider 12A with three branches by PLL, and the system clock obtained by the oscillator 43 is supplied to the DDS oscillators 43A, 43B via a power divider 44 with two branches.

The DDS oscillators 43A, 43B are driven by identical system clock phase locked to the reference frequency signal FREF, so it generates a sixth frequency signal with a frequency fc and a seventh frequency signal with a frequency fc+Δf, in which a relative phase noise is reduced less than a relative phase noise corresponding to the low relative phase noise optical comb generation device 20.

In addition, in the low relative phase noise optical comb generation device 40, about the components identical with the components of the low relative phase noise optical comb generation device 20, identical reference numbers are given, and detailed explanations are omitted.

The third and fourth frequency converters 24A, 24B supply ninth and tenth frequency signals with a sum frequency f9=f6+f=fb, f10=f7+f8=fb+Δf of a sixth frequency signal with a frequency fc and a seventh frequency signal with a frequency fc+Δf with reduced relative phase noise obtained by the DDS oscillators 43A, 43B, and the eighth frequency signal with a frequency f8=fb-fc given by the eighth oscillator 23, to the first and second frequency converters 14A, 14B via the band pass filters 26A, 26B.

In the first and second frequency converters 14A, 14B, a first modulation signal with a frequency fm obtained as a sum frequency signal of the third frequency signal with a frequency f3=fm−fb given by the third oscillator 13 and the ninth and tenth frequency signals supplied by the third and fourth frequency converters 24A, 24B via the band pass filters 26A, 26B is supplied from the first frequency converter 14A to the first optical comb generator 15A as a driving signal, and a second modulation signal with a frequency fm+Δf is supplied from the second frequency converter 14B to the second optical comb generator 15B as a driving signal.

Figure 9:
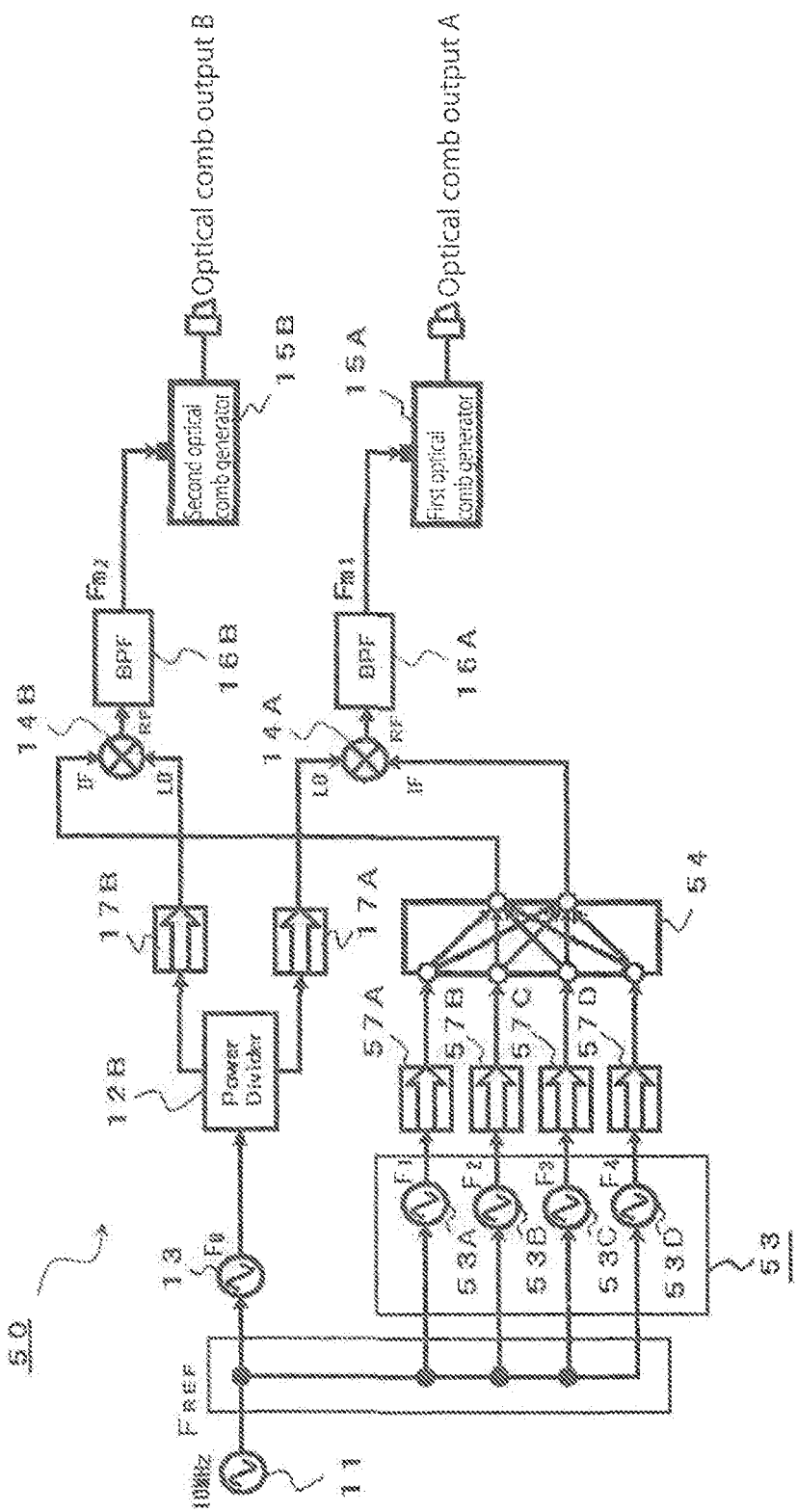
FIG. 9 is a block diagram illustrating other example of a low relative phase noise optical comb generation device applying the present invention.

In a low relative phase noise optical comb generation device 50 illustrated in FIG. 9, by inputting four types of frequency signals output from a synthesizer circuit 53 by cyclically switching the frequency signals via a switching circuit 54, instead of the first and second oscillators 13A, 13B in the low relative phase noise optical comb generation device 10, two types of frequency signals with mutually different cycles in which modulation cycles are switched cyclically are supplied to the first and second frequency converters 14A, 14B.

In addition, in the low relative phase noise optical comb generation device 50, about the components identical with the components of the low relative phase noise optical comb generation device 10, identical reference numbers are given, and detailed explanations are omitted.

The low relative phase noise optical comb generation device 50 comprises: a synthesizer circuit 53 for outputting four independent frequency signals (F1: 1000 MHz, F2:

1010 MHz, F3: 1000.5 MHz, F4: 1010.5 MHz) for example with a difference frequency of 500 kHz; and a switching circuit 54 with four inputs and two outputs to which four frequency signals are input from the synthesizer circuit 53 respectively via isolators 57A, 57B, 57C, 57D, and the first and second frequency converters 14A, 14B are connected to the two outputs of the switching circuit 54.

In the low relative phase noise optical comb generation device 50, the first oscillator 13 supplies a frequency signal with a frequency F0 (for example, 24 GHz) with a fixed oscillation phase and phase locked to the reference frequency signal FREF supplied from the reference oscillator 11 via a power divider 52 with five branches to the first and second frequency converters 14A, 14B.

The synthesizer circuit 53 comprises four oscillators 53A, 53B, 53C, 53D for generating frequency signals with four types of frequencies F1, F2, F3, F4 with mutually different fixed frequencies respectively phase locked to the reference frequency signal FREF supplied from the reference oscillator 11 via the power divider 52 with five branches.

A second oscillator 53A generates a first frequency signal fixed to a first frequency F1 (1000 MHz) phase locked to the reference frequency signal FREF generated by the reference oscillator 11 by PLL circuit.

Also, a third oscillator 53B generates a second frequency signal fixed to a second frequency F2 (1010 MHz) phase locked to the reference frequency signal FREF generated by the reference oscillator 11 by PLL circuit.

Also, a fourth oscillator 53C generates a third frequency signal fixed to a third frequency F3 (1000.5 MHz) phase locked to the reference frequency signal FREF generated by the reference oscillator 11 by PLL circuit.

Further, a fifth oscillator 53D generates a fourth frequency signal fixed to a fourth frequency F4 (1010.5 MHz) phase locked to the reference frequency signal FREF generated by the reference oscillator 11 by PLL circuit.

The switching circuit 54 alternately outputs four types of frequency signals with 1 GHz band input from the synthesizer circuit 53 via the isolators 57A, 57B, 57C, 57D from two output terminals by switching the frequency signals cyclically. In other words, the switching circuit 54 functions as a selector switch with four inputs and two outputs for cyclically switching four types of frequency signals with 1 GHz band to be supplied to the first and second frequency converters 14A, 14B connected to the two output terminals.

Here, by inserting the isolators 57A, 57B, 57C, 57D between the synthesizer circuit 53 and the switching circuit 54, and by inputting frequency signals from the synthesizer circuit 53 to the switching circuit 54 via the isolators 57A, 57B, 57C, 57D, an operation of a signal source is prevented from being unstable with a load fluctuation by an opening or a short-circuit of circuits after the switching circuit 54.

As the isolators 57A, 57B, 57C, 57D, a microwave amplifier with large reverse isolation, a Pi-pad attenuator or a T-pad attenuator, an isolation element such as a microwave isolator using ferrite, and an isolation circuit combining a variable attenuator and a band pass filter, or an isolation circuit combining an isolation amplifier and a resistance attenuator or a band pass filter, can be used.

And, the first and second frequency converters 14A, 14B obtain a first and second modulation signals Fma, Fmb, in which frequencies are converted to four types of modulation frequencies Fm1, Fm2, Fm3, Fm4 with 25 GHz band, from the frequency signal with a frequency F0 (for example, 24 GHz) supplied from the first oscillator 13 and the frequency signals with four types of frequencies F1, F2, F3, F4 with 1 GHz band switched cyclically by the switching circuit 54, and supply the modulation signals to the first and second optical comb generators 15A, 15B as driving signals.

In other words, the first and second frequency converters 14A, 14B function as up converters for converting the frequency signals with 1 GHz band to the first and second modulation signals Fma, Fmb with 25 GHz band to be supplied to the first and second optical comb generators 15A, 15B as driving signals.

Here, the low relative phase noise optical comb generation device 50 generates two types of optical combs as a reference light pulse and a measuring light pulse for performing an absolute distance measurement requiring a switching of frequencies in a three-dimensional profiler or an optical comb distance meter described in Patent Document 1, Patent Document 2 and else, and, as indicated in Table 1, by supplying the first and second modulation signals Fma, Fmb obtained by cyclically switching the frequency signals with four types of frequencies F1, F2, F3, F4 with 1 GHz band by the switching circuit 54 and by up-converting to four types of modulation frequencies Fm1, Fm2, Fm3, Fm4 with 25 GHz band by the first and second frequency converters 14A, 14B to the first and second optical comb generators 15A, 15B as the driving signals, two types of optical combs with mutually different modulation cycles switched cyclically are output from the first and second optical comb generators 15A, 15B.

TABLE 1

| Setting | OFCG1/OFCG2 | Phase difference |
|---|---|---|
| #1 | $f_m/(f_m + \Delta f)$ | $-2\pi f_m T$ |
| #2 | $(f_m + \Delta f_m)/(f_m + \Delta f_m + \Delta f)$ | $-2\pi(f_m + \Delta f_m)T$ |
| #3 | $(f_m + \Delta f)/f_m$ | $-2\pi(f_m + \Delta f)T$ |
| #4 | $(f_m + \Delta f_m + \Delta f)/(f_m + \Delta f_m)$ | $-2\pi(f_m + \Delta f_m + \Delta f)T$ |

Figure 10:
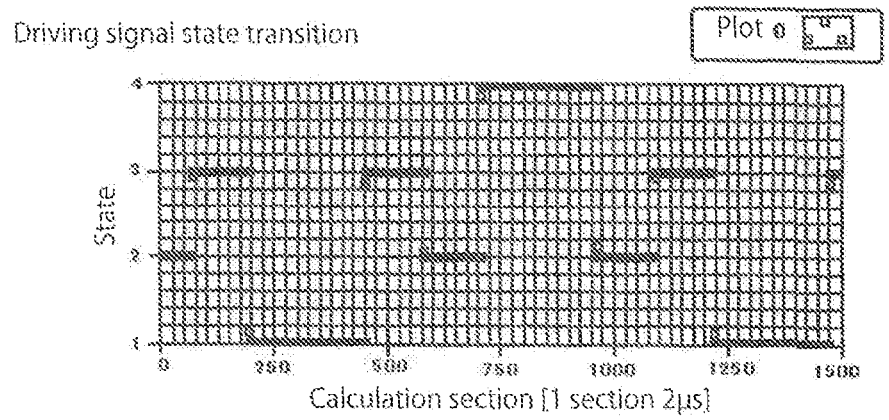
FIG. 10 is a state transition chart illustrating a state transition of driving signals supplied to two optical comb generators in the low relative phase noise optical comb generation device.

Table 1 indicates a transition state OFCG1/OFCG2 of driving signals of the first and second optical comb generators 15A, 15B in settings of #1 to #4 and its phase difference, and frequencies of driving signals are $\Delta f=500$ kHz, $\Delta fm=10$ MHz, fm=Fm1 (25000 MHz), fm+$\Delta$fm=Fm2 (25010 MHz), fm+$\Delta$f=Fm3 (25000.5 MHz), fm+$\Delta$fm+$\Delta$f=Fm4 (25010.5 MHz). FIG. 10 is a state transition chart illustrating a state transition of driving signals supplied to two optical comb generators 15A, 15B in the low relative phase noise optical comb generation device 50.

Here, in the optical comb distance meter, by using a reference light pulse and a measuring light pulse with coherence emitted as a pulse from two optical comb generators driven by two types of modulation signals with different frequencies in principle, a frequency analysis of an interference signal (hereinafter, referred to as a reference signal) obtained by a reference light detector and an interference signal (hereinafter, referred to as a measuring signal) obtained by a measuring light detector is performed by a signal processing unit, and a mode number counted from a center frequency of an optical comb is defined as N, a phase difference of N-order mode of the reference signal and the measuring signal is calculated to offset a light phase difference of an optical comb production and transmission process from the optical comb generators to a reference point, and then, a distance from the reference point to a measuring surface is calculated by determining a phase difference of signal pulses by calculating an increment of a phase difference per one order in a frequency axis.

In addition, when a measuring distance is beyond a half-wavelength of a modulation frequency fm, a distance of integral multiple of a half-wavelength will be unidentifiable due to a periodicity of an object light, and a distance cannot be determined uniquely, so measurements are performed four times by using the reference light pulse and the measuring light pulse in which modulation frequencies are set in four ways as indicated in Table 1, and in the signal processing unit, a distance beyond an ambiguity distance ($L_a$=c/2fm c: light speed) corresponding to a half-wavelength is calculated by using each of phase difference obtained by performing same process.

In other words, a phase difference of the reference signal and the measuring signal obtained by measuring the modulation frequencies set in four ways as indicated in Table 1 will be: $-2\pi$fmT in a setting of #1 in which modulation frequencies of modulation signals for driving two optical comb generators (OFCG1, OFCG2) are fm and fm+$\Delta$f; $-2\pi$(fm+$\Delta$fm)T in a setting of #2 in which the modulation frequencies of the modulation signals are fm+$\Delta$fm and fm+$\Delta$fm+$\Delta$f; $-2\pi$(fm+$\Delta$f)T in a setting of #3 in which the modulation frequencies of the modulation signals are fm+$\Delta$f and fm; and $-2\pi$(fm+$\Delta$fm+$\Delta$f)T in a setting of #4 in which the modulation frequencies of the modulation signals are fm+$\Delta$fm+$\Delta$f and fm+$\Delta$fm.

When a distance ($L_a$=c/2fm c: light speed) is long, a phase difference ($-2\pi$fmT) of the reference signal and the measuring signal will be in a form of $\varphi+2m\pi$ wherein m is an integer, and $\varphi$ can be determined by calculation, but an integer value m is unidentifiable.

On the other hand, a difference between the phase difference $-2\pi$fmT of the reference signal and the measuring signal in the setting of #1 and the phase difference $-2\pi$(fm+$\Delta$fm)T of the reference signal and the measuring signal in the setting of #2 is $2\pi\Delta$fmT, and also, a difference between the phase difference $-2\pi$(fm+$\Delta$f)T of the reference signal and the measuring signal in the setting of #3 and the phase difference $-2\pi$(fm+$\Delta$fm+$\Delta$f)T of the reference signal and the measuring signal in the setting of #4 is $2\pi\Delta$fmT, and a phase will be determined uniquely until a distance (when $\Delta$ fm=10 MHz, La is 15 m) corresponding to a half-wavelength of $\Delta$fm.

And, the integer m can be determined by comparing with the phase difference of #1 by multiplying this phase by fm/$\Delta$fm.

Further, $2\pi\Delta$f is obtained from a difference between the phase difference $-2\pi$fmT in the setting of #1 and the phase difference $-2\pi$(fm+$\Delta$f)T in the setting of #3.

Here, when fm=25 GHz, $\Delta$f=500 kHz, $\Delta$fm=10 MHz, as A f=500 kHz, a distance measurement until La=300 m can be performed.

In an optical comb distance meter mounting the low relative phase noise optical comb generation device 50, an absolute distance measurement is performed by using the reference signal and the measuring signal obtained by measuring the modulation frequencies set in four ways as indicated in Table 1. In other words, after maintaining one state for a certain time, it will be transit to other state, and a signal phase measurement of the state is performed at a certain period, and a calculation process of an absolute distance is performed by using phases of setting states of #1, #2, #3, #4.

A measurement speed in the optical comb distance meter is 500 kHz as equal to $\Delta$f in a relative distance measurement within 6 mm, but in an absolute distance measurement requiring a switching of frequencies, it will be a time including a frequency switching time and an absolute distance calculating time.

In the low relative phase noise optical comb generation device 50, as the isolators 57A, 57B, 57C, 57D are inserted between the synthesizer circuit 53 and the switching circuit 54, an operation of the synthesizer circuit 53 will not be unstable by a load fluctuation at the moment when switching the frequency signals with four types of frequencies F1, F2, F3, F4 cyclically by the switching circuit 54, and a driving state of the optical comb generators 15A, 15B can be transit by switching driving signals of the optical comb generators 15A, 15B rapidly. In other words, a driving state of the first and second optical comb generators 15A, 15B can be transit rapidly by switching the four types of modulation frequencies Fm1, Fm2, Fm3, Fm4 by the switching circuit 54, and a measuring time of an absolute distance can be shortened by using as two optical comb light sources for performing absolute distance measurement by switching modulation frequencies of the reference signal and the measuring signal.

In addition, when performing a distance measurement only, it can be performed by the settings of #1 and #2 only, or by the settings of #3 and #4 only, but by the settings of #1, #2, #3, #4 as the above, in other words, by switching the four types of modulation signals Fm1, Fm2, Fm3, Fm4 cyclically by the switching circuit 54, an absolute distance measurement result with high accuracy can be obtained by reducing a phase offset according to a signal transmission path of a distance other than a distance to be measured. In other words, when switching modulation frequencies of two optical comb generators (OFCG1, OFCG2), in a phase derived from a distance to be measured, an absolute value will not be changed, but a sign will be inversed. On the other hand, in an offset derived from a length of a cable of an interference signal transmission path, a sign will not be changed and will be a constant value. Therefore, a phase value excluding an offset can be determined by subtracting results of two phase measurements and dividing by two.

GLOSSARY OF DRAWING REFERENCES 10, 20, 30, 40, 50 Low relative phase noise optical comb generation device
11 Reference oscillator
12A, 12B, 22A, 22B, 32, 44, 52 Power divider
13, 13A, 13B, 23, 23A, 23B, 33, 33A, 33B, 43, 43A, 43B, 53A, 53B, 53C, 53D Oscillator
14, 14A, 14B, 24A, 24B, 143 Frequency converter
15A, 15B Optical comb generator
16A, 16B, 26A, 26B Band pass filter
17A, 17B, 57A, 57B, 57C, 57D Isolator
53 Synthesizer circuit
54 Switching circuit
141 Phase comparator
142 Voltage-controlled oscillator

The invention claimed is:
1. A low relative phase noise optical comb generation device, comprising:
at least three oscillators for generating frequency signals with mutually different frequencies;
at least two frequency converters to which a frequency signal obtained by one oscillator of the at least three oscillators and respective frequency signals obtained by respective oscillators other than the one oscillator are input; and
at least two optical comb generators to which at least two types of modulation signals with mutually different frequencies converted by the at least two frequency converters are supplied,
wherein the at least two frequency converters supply the at least two types of modulation signals, in which a relative phase noise is reduced respectively as a sum frequency signal or a difference frequency signal of the frequency signal by the one oscillator and a frequency signal by other oscillator, to the at least two optical comb generators as driving signals.

2. The low relative phase noise optical comb generation device according to claim 1, wherein the respective oscillators other than the one oscillator of the at least three oscillators are having a phase noise lower than a phase noise of the one oscillator.

3. The low relative phase noise optical comb generation device according to claim 1, wherein the at least three oscillators generate frequency signals with mutually different frequencies phase locked to a reference frequency signal given by a reference oscillator.

4. The low relative phase noise optical comb generation device according to claim 1, wherein the at least two frequency converters are respectively a frequency mixer.

5. The low relative phase noise optical comb generation device according to claim 1, wherein the at least two frequency converters are respectively composed of a frequency mixer, a phase comparator, and a voltage-controlled oscillator.

6. The low relative phase noise optical comb generation device according to claim 1, wherein the modulation signals are supplied as driving signals from the at least two frequency converters to the at least two optical comb generators respectively via a band pass filter.

7. The low relative phase noise optical comb generation device according to claim 1, wherein the frequency signal obtained by the one oscillator is input to the at least two frequency converters respectively via an isolator.

8. The low relative phase noise optical comb generation device according to claim 1, wherein the at least three oscillators generate at least three types of frequency signals respectively in a state that a frequency is fixed to a frequency phase locked to the reference frequency signal by a PLL circuit.

9. The low relative phase noise optical comb generation device according to claim 3, wherein the respective oscillators other than the one oscillator of the at least three oscillators are respective direct digital synthesizer (DDS) oscillators driven by a clock phase locked to the reference frequency signal.

10. The low relative phase noise optical comb generation device according to claim 3, comprising: three oscillators for generating frequency signals with mutually different frequencies phase locked to the reference frequency signal; two frequency converters; and two optical comb generators,
wherein two types of modulation signals with reduced relative phase noise obtained by the two frequency converters are supplied to the two optical comb generators as driving signals.

11. The low relative phase noise optical comb generation device according to claim 3, comprising: (X+Y) oscillators for generating frequency signals with mutually different frequencies phase locked to the reference frequency signal; XY frequency converters; and Y optical comb generators, wherein X is an integer of 1 or more and Y is an integer of two or more,
wherein a basic structure composed of (Y+1) oscillators, Y frequency converters, and Y optical comb generators is multiplexed by X.

* * * * *